J. BLACKBURN.
STEERING WHEEL.
APPLICATION FILED FEB. 12, 1917.
1,366,552.
Patented Jan. 25, 1921.
3 SHEETS—SHEET 1.
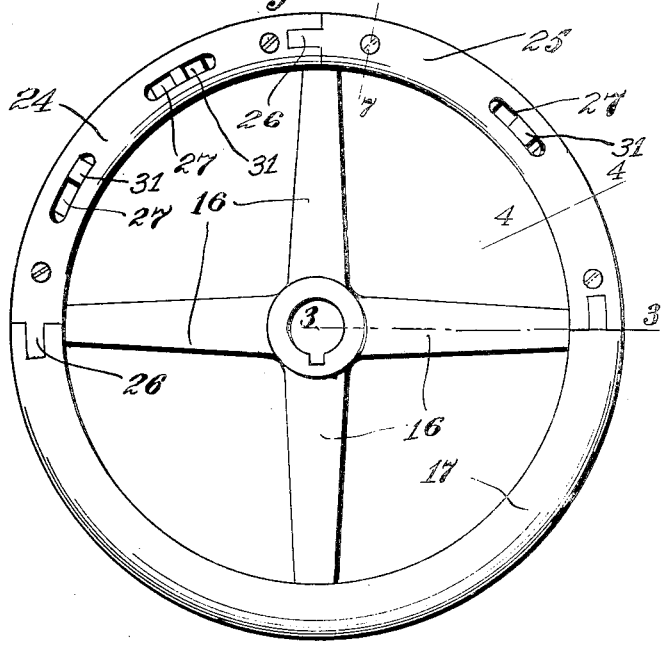
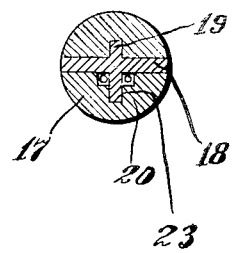
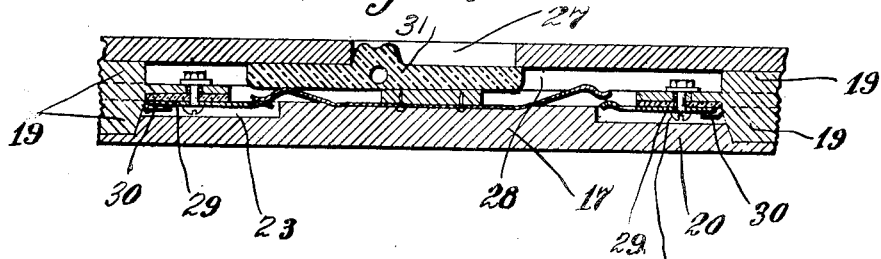
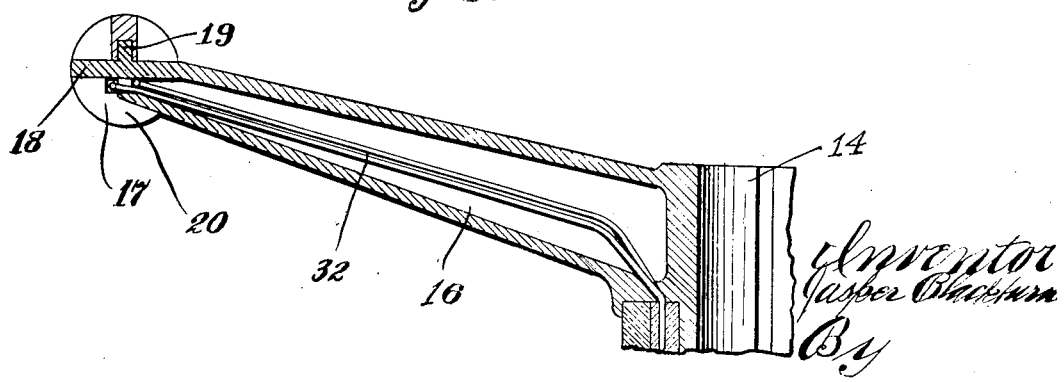

J. BLACKBURN.
STEERING WHEEL.
APPLICATION FILED FEB. 12, 1917.

1,366,552.

Patented Jan. 25, 1921.
3 SHEETS—SHEET 2.

Inventor
Jasper Blackburn
By
Edward E. Longan Atty.

J. BLACKBURN.
STEERING WHEEL.
APPLICATION FILED FEB. 12, 1917.
1,366,552.
Patented Jan. 25, 1921.
3 SHEETS—SHEET 3.
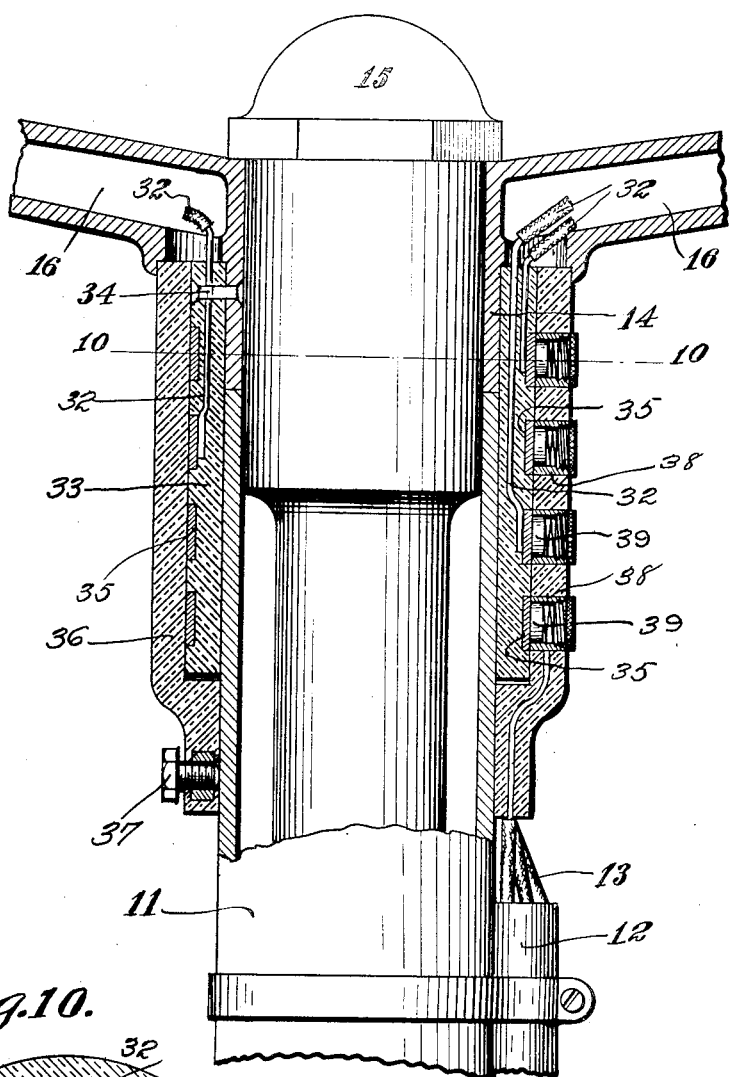
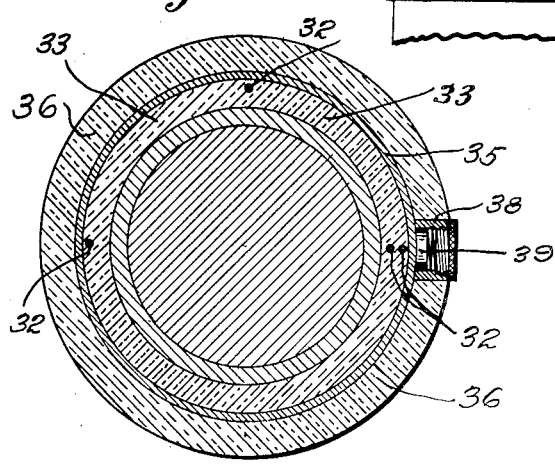

UNITED STATES PATENT OFFICE.

JASPER BLACKBURN, OF WEBSTER GROVES, MISSOURI, ASSIGNOR TO THE BLACKBURN PATENT STEERING WHEEL COMPANY, OF ST. LOUIS, MISSOURI, A CORPORATION OF MISSOURI.

STEERING-WHEEL.

1,366,552.      Specification of Letters Patent.      Patented Jan. 25, 1921.

Application filed February 12, 1917. Serial No. 148,238.

*To all whom it may concern:*

Be it known that I, JASPER BLACKBURN, a citizen of the United States, and resident of Webster Groves, county of St. Louis, and State of Missouri, have invented certain new and useful Improvements in Steering-Wheels, of which the following is a specification, containing a full, clear, and exact description, reference being had to the accompanying drawings, forming a part hereof.

My invention relates to improvements in "steering wheels", wherein switches, or circuit making and breaking devices are built into the rim of the wheel in a manner to facilitate the control of the various electrical devices of an automobile, motor boat, aeroplane, or the like.

My object is to provide a steering wheel with electrical switches, in order to dispose the switches more conveniently accessible without detracting from the steering efficiency of the wheel.

My invention consists in the novel details of the construction, arrangement and combination of parts as will be fully, clearly and concisely set forth in my specification, pointed out in my claims and illustrated by the accompanying drawings, in which—

Figure 1 is a plan on a reduced scale of a steering wheel embodying my improvements.

Fig. 2 is a fragmental sectional elevation of the wheel rim and a two-way switch.

Fig. 3 is a sectional elevation taken on the line 3—3 of Fig. 1.

Fig. 4 is a transverse sectional elevation taken on the line 4—4 of Fig. 1.

Fig. 9 is an enlarged sectional elevation showing the connection between the wheel and steering column and certain movable circuit maintaining elements permitting rotary motion of the steering wheel, and Fig. 10 is a sectional plan taken on the line 10—10 of Fig. 9.

Figure 5:
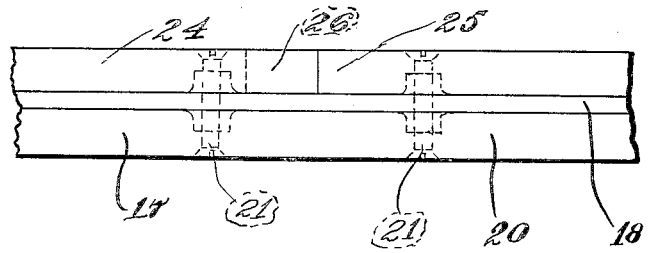
Fig. 5 is a fragmental elevation of the wheel rim showing a joint between certain removable rim elements.

Referring to the drawings by numerals, 11 designates the steering column, and 12 a tubular inclosure for conducting wires 13 leading from a source of energy and to the various electrical devices of the machine.

The numeral 14 designates the hub of the steering wheel, which is rotatably mounted on the steering column and held against axial movements by retaining nut 15.

Extending radially from the hub 14 are the arms 16, which are formed tubular and which are connected at their outer ends by a rim 17. By preference the hub, arms and rim are constructed as an integral unit and the rim, in cross section of Greek cross formation, which shape is rigid and of light weight, and provides for the simple application of the grip elements of the wheel.

Figure 7:
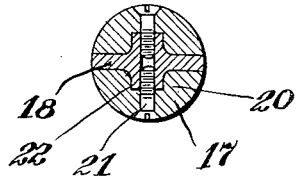
Fig. 7 is a transverse sectional elevation taken on the line 7—7 of Fig. 1.
Figure 8:
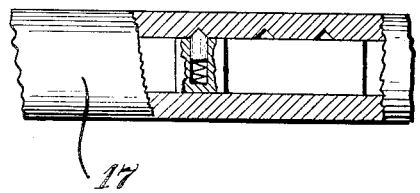
Fig. 8 is a fragmental elevation, partly in section, showing means for holding the two-way switch in various set positions.

As shown, the rim consists of a substantially flat ring 18 and right angle flanges 19, and the under half of the grip consists of a circular element 20, "half round" in cross-section, whose flat face is fitted to the lower face of the ring 18 and secured, as shown in Fig. 7, by screws 21, which are threaded into seats 22 formed in the under flange 19 and it is to be noted that there is formed in the flat face of the grip element 20 a groove 23, which accommodates the flange 19 in a manner to hold the grip rigidly to the rim, and it is to be further noted that the groove 23 is formed larger at its open top to accommodate on each side of the flange 19 the conducting wires.

The upper half of the grip comprises two or more sectors 24 and 25, which are secured to the rim in the same manner as the grip element 20, and by preference the ends are provided with scarf joints 26 to render possible a smooth, uninterrupted grip surface.

Figure 6:
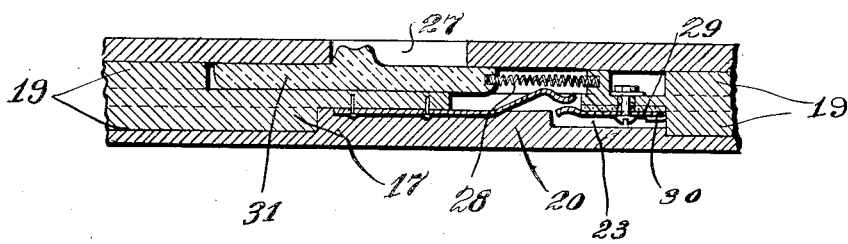
Fig. 6 is a view similar to Fig. 2, showing a one-way switch, spring actuated in one direction.

As clearly shown in Figs. 1, 2 and 6 the sectors 24 and 25 of the grip are provided with slots 27, which intersect the grooves 28 formed in the grip sections, and in which are mounted for movements the switches which comprise the terminals 29 connected with the wires 30 occupying groove 23, and the sliding switch block 3, a portion of which block extends through the slot to be manipulated.

The specific construction of the switch block and the arrangement of the terminals may vary to be adaptable to different requirements as, for instance, in Fig. 2 I show a two-way switch which may be employed in connection with a head light, wherein it is desirable to have independent circuits for different luminosities, while in Fig. 6 I show a one-way switch for use in connection with a signal device, and which is spring held in one direction.

The wires 30 connected with the switches as described, extend from their respective terminals in the steering wheel, along the channels therefor to the adjacent arm of the wheel, thence through the arm where they are designated 32, to an insulating "fiber" sleeve 33 connected to rotate with the hub of the steering wheel by a rivet or screw 34.

The sleeve 33 has embedded therein the rings 35, which are exposed to the outer surface of the sleeve and said wires 32 are each connected with one of the rings.

The numeral 36 designates a second fiber sleeve which surrounds the sleeve 33, and is fixed to the steering column 11 by means of a screw 37.

Fitted in the sleeve 36 are the insulated, internally threaded brush holders 38, which open to the outer face of the fiber sleeve in order to facilitate the insertion of a brush 39, which is spring held against one of the rings in the inner fiber sleeve.

The wires 13 previously mentioned, are each extended through the body of the sleeve 36 and are connected with said brush holders.

It is apparent from this showing that the wires are totally concealed and that the rings and brushes maintain continuities of circuits, and allow for rotary movements of the steering wheel.

Having thus described my invention, what I claim is:

1. A steering wheel for automobiles and the like, comprising a rim provided with a concealed channel, a hub, hollow arms connecting the hub and rim, a series of conducting wires located within the channel of the rim and the arms, and a series of electric circuit making and breaking devices positioned in the channel within the rim.

2. A steering wheel for automobiles and the like, comprising a rim, a series of independent circuit making and breaking devices located within the rim, a hub, arms connecting the hub and rim, each arm being provided with a channel adapted to receive a pair of electrical conductors leading from the hub to an electric contact making and breaking device located within the rim.

3. A steering wheel for automobiles and the like, comprising a rim, a hub, arms connecting the rim and hub, the said rim being provided with a concealed channel, terminals of conducting wires forming independent circuits located in the channel within the rim, a series of circuit making and breaking devices mounted within the rim, and means for concealing and protecting the conductors from the hub to the contact making and breaking devices within the rim.

4. A steering mechanism for motor vehicles, comprising a steering column, a wheel having a rim provided with a concealed channel, a hub and a hollow arm connecting said rim and hub, a circuit making and breaking device mounted within the rim, a conductor secured to said circuit making and breaking device, said conductor being located within the hollow arm and electrically connected to a terminal carried by and movable with said hub, a stationary sleeve mounted on said column and extending over the terminal carried by the hub, a contact terminal carried by said stationary sleeve and a conductor leading from said last mentioned terminal.

5. A steering wheel for motor vehicles comprising a rim provided with a concealed channel, a circuit making and breaking device located within said channel, a hub, an arm extending from the hub to the rim and provided with a channel, the channel of the arm communicating with the channel within the rim, a pair of conductors located within the channel in the arm and the channel in the rim and connected to the circuit making and breaking devices whereby the conductors from the hub are totally concealed and protected.

6. A steering mechanism for motor vehicles comprising a steering column and wheel having a rim provided with a concealed channel, a hub and hollow arm connecting said rim and hub, the opening in the arm communicating with the concealed channel in the rim, a circuit making and breaking device mounted in the channel within the rim, a conductor secured to said circuit making and breaking device, located within the channel of the rim and within the hollow arm, an insulating sleeve carried by said hub, an annular contact terminal carried by said sleeve to which said conductor is connected, a sleeve secured to the column and mounted over said insulating sleeve, a contact terminal secured to the sleeve carried by the column, and a conductor secured to said contact.

7. A steering wheel for automobiles and the like comprising a rim, provided with a concealed channel, affording a hand grip and an extended supporting surface, a wheel hub, a series of separate and independent circuit making and breaking devices carried by the said wheel rim, spokes provided with channels connecting the wheel rim and hub, conductors located in the channels within the rim and the spokes and concealed and protected entirely from the making and breaking devices to the wheel hub.

8. A steering mechanism for motor vehicles comprising a steering wheel having hollow arms and a rim with a concealed channel, a hub, a steering column, a conductor terminal carried by the hub and rotatable therewith, contact making and breaking devices located within the wheel rim, a conductor leading from the contact making and breaking devices and extending through the hollow arms and through an outlet formed therein outside of the hub proper and connected to the conductor terminal rotatable with the hub, a sleeve secured to the steering column and embracing the conductor terminal carried by the hub, and a spring contact carried by said sleeve having electrical connection with the aforesaid conductor terminal.

9. A steering wheel for motor vehicles and the like comprising a rim provided with a concealed channel, a circuit making and breaking device located within said channel, a hub, an arm extending between the hub and the rim and provided with a channel, the channel within the arm communicating with the channel in the rim, a conductor located within the channel in the arm and the channel in the rim and connected with the circuit making and breaking device whereby the conductors from the hub are totally concealed and protected.

10. A steering wheel for automobiles and the like comprising a rim provided with a concealed channel affording a hand grip and an extended supporting surface, a circuit making and breaking device carried by said wheel rim and concealed and protected by the wheel rim, a wheel hub, a spoke connecting the hub and the rim and provided with a concealed channel extending from the channel within the rim to the hub and a conductor located in the channel in the rim and the channel in the hub and concealed and protected from the contact making and breaking device to the wheel hub.

In testimony whereof I have signed my name to this specification, in presence of two subscribing witnesses.

JASPER BLACKBURN.

Witnesses:
R. G. ORWIG,
M. E. KLEE.